United States Patent
de Sousa et al.

(10) Patent No.: US 9,153,996 B2
(45) Date of Patent: Oct. 6, 2015

(54) METHOD AND ELECTRIC COMBINED DEVICE FOR POWERING AND CHARGING WITH COMPENSATION MEANS

(75) Inventors: Luis de Sousa, Eragny sur Seine (FR); Boris Bouchez, Cergy le Haut (FR)

(73) Assignee: Valeo Systemes de Controle Moteur, Cergy Pontoise Cedex (FR)

(*) Notice: Subject to any disclaimer, the term of this patent is extended or adjusted under 35 U.S.C. 154(b) by 1033 days.

(21) Appl. No.: 13/128,925

(22) PCT Filed: Nov. 17, 2009

(86) PCT No.: PCT/EP2009/065335
§ 371 (c)(1),
(2), (4) Date: Oct. 10, 2011

(87) PCT Pub. No.: WO2010/057893
PCT Pub. Date: May 27, 2010

(65) Prior Publication Data
US 2012/0019173 A1    Jan. 26, 2012

(30) Foreign Application Priority Data
Nov. 18, 2008  (FR) ..................... 08 06456

(51) Int. Cl.
*H02P 1/00* (2006.01)
*H02J 7/02* (2006.01)
*B60L 11/18* (2006.01)

(52) U.S. Cl.
CPC ............. *H02J 7/022* (2013.01); *B60L 11/1811* (2013.01); *Y02T 10/7005* (2013.01); *Y02T 10/7094* (2013.01); *Y02T 90/127* (2013.01); *Y02T 90/14* (2013.01)

(58) Field of Classification Search
USPC .......................................... 318/139
See application file for complete search history.

(56) References Cited

U.S. PATENT DOCUMENTS

| | | | | |
|---|---|---|---|---|
| 5,386,185 A | * | 1/1995 | Beck et al. ............ | 318/762 |
| 5,424,622 A | * | 6/1995 | Keller et al. .......... | 318/375 |
| 5,457,372 A | * | 10/1995 | Pignatelli et al. ...... | 318/760 |
| 8,629,636 B2 | * | 1/2014 | Bouchez et al. ....... | 318/139 |
| 2004/0178754 A1 | | 9/2004 | Anwar et al. | |
| 2012/0104988 A1 | * | 5/2012 | Ramu .................... | 318/722 |

FOREIGN PATENT DOCUMENTS

| | | |
|---|---|---|
| EP | 0 603 778 A1 | 6/1994 |
| JP | H08-126121 A | 5/1996 |
| WO | 97/08009 A1 | 3/1997 |

OTHER PUBLICATIONS

English translation of Office Action issued in Japanese Patent Application No. 2011-543771, mailed on Sep. 3, 2013 (14 pages).

(Continued)

*Primary Examiner* — Kawing Chan
(74) *Attorney, Agent, or Firm* — Osha Liang LLP

(57) ABSTRACT

The invention relates to a combined device and method for powering and charging, that comprises an AC motor (6), a converter (2), storage means (5), and switching means (4) either for enabling the powering of the motor (6) or for enabling the charging of the storage means (5) by the converter. The device includes means for compensating the magnetic fields generated during the charge of the storage means (5) in order to limit or prevent the movements of the motor (6) rotor.

13 Claims, 4 Drawing Sheets

(56) References Cited

OTHER PUBLICATIONS

International Search Report w/translation from PCT/EP2009/065335 dated Feb. 16, 2010 (6 pages).

Sul, S K et al.; "An Integral Battery Charger for Four-Wheel Drive Electric Vehicle"; IEEE Transactions on Industry Applications 31(1995) Sep./Oct., No. 5, New York, US (4 pages).

\* cited by examiner

METHOD AND ELECTRIC COMBINED DEVICE FOR POWERING AND CHARGING WITH COMPENSATION MEANS

The present invention relates to a combined power supply and charging electric device and an associated method and is situated in the field of motors or alternators powered by rechargeable batteries.

The invention is advantageously applicable in the field of electric motor vehicles in which the batteries can power the motor via an inverter and be recharged when the motor vehicle is at a standstill.

However, although particularly designed for such an application, the device and the associated method can be used in other fields, and notably in wind-turbine or hydraulic-type energy generation devices.

BACKGROUND OF THE INVENTION

Conventionally, an electric vehicle is equipped with high-voltage batteries delivering a DC current to an inverter which transforms this DC current into an AC current making it possible to power an electric motor, the latter ensuring the movement of the vehicle.

So as to ensure the recharging of these high-voltage batteries, it is known to equip the vehicle with an embedded charging device mainly comprising an AC/DC converter making it possible to rectify the AC power from the electrical network to charge the batteries. The device also advantageously comprises a DC-DC converter adapting the network voltage level to that of the batteries.

The electronic components of the power supply subsystem on the one hand and of the charging subsystem on the other hand are costly. Moreover, the powering of the motor and the charging of the batteries are performed with different phases, so it has been proposed, in the applications EP 0 603 778 and WO97/08009, to reuse a part of the motor and of the components used to power it to implement the battery charging device.

To this end, the battery charging device uses the inverter to form an AC-DC converter and the windings of the motor to form the inductances. The switchover from the motor power supply mode to the battery charging mode is handled by switching means with power contactors by disconnecting the neutral.

The use of power connectors is, however, problematical in the sense that, because they carry current for the electric machine, they have to be overengineered. To overcome this drawback, one solution consists in producing a structure having integrated switching means with H-shaped bridges.

However, in the two abovementioned cases, the use of the phases of the motor as inductance for rectifying the current of the electrical network causes disturbances on the rotor of the motor. In practice, the inductances are magnetized by the alternating currents, thus creating magnetic fields. These magnetic fields act on the rotor which may start to move, for example by vibrating, and even, depending on the magnetic fields and characteristics of the rotor, start rotating. This setting in motion poses problems with regard to both comfort and safety in the case of a use of the combined electric device in an electric vehicle, even if the latter may be equipped with a system for decoupling the axle system from the machine during charging.

SUBJECT OF THE INVENTION

The aim of the present invention is to propose a device and a method that make it possible to power the motor and charge the battery by using elements of the motor and of the inverter and such that the device and the method make it possible to overcome the abovementioned drawbacks when charging the energy energy storage means.

SUMMARY OF THE INVENTION

To this end, the invention targets a combined power supply and charging method includes a control step making it possible to switch from a motor power supply mode to an energy energy energy storage means charging mode on an electrical network and vice versa. It also includes a step for compensating for the magnetic fields during the energy energy storage means charging step making it possible to limit or eliminate the movements of the rotor.

This method can be implemented in a device equipped with a motor and linked to an electrical network the number of phases of which is less than the number of phases of the motor, the compensation step then being able to include an operation consisting in injecting, into the phase or phases of the motor that are not linked to a phase of the network, a compensation current. This compensation current can be slaved to the position of the rotor of the motor and/or to the charge current injected into the phases of the motor that are linked to a phase of the electrical network.

Alternatively, or in addition, the compensation step may include an operation consisting in rectifying, by a diode bridge, the electrical network, as well as an operation consisting in injecting the charge current via the mid-point of at least one inductive winding of the stator of the motor. In this case, during said current injection operation, the same current can be injected into each of the halves of said inductive winding, which makes it possible to lower the inductance of the corresponding winding, leaving only its leakage inductance apparent.

The method can be implemented in a device equipped with a three-phase motor and linked to a single-phase electrical network, the compensation step including an operation consisting in rectifying, by a diode bridge, the electrical network, and an operation consisting in injecting, into the phase or phases of the motor that are not linked to a phase of the network, a current equal to the charge current injected into the phase or phases of the motor that are linked to a phase of the network.

The method can also be implemented in a device equipped with a three-phase motor and linked to a single-phase electrical network, the compensation step including an operation consisting in injecting, into the phase or phases of the motor that are not linked to a phase of the network, a current equal to the charge current injected into the phase or phases of the motor that are linked to a phase of the network.

The method can also be implemented in a device equipped with a three-phase motor and linked to a single-phase electrical network, the compensation step including an operation consisting in rectifying, by a diode bridge, the electrical network, and an operation consisting in injecting the charge current via the mid-point of at least one coil of the stator of the motor.

The method can also be implemented in a device equipped with a three-phase motor, and linked to a single-phase electrical network, the compensation step including an operation consisting in injecting the charge current via the mid-point of at least one coil of the stator of the motor.

The method can also be implemented in a device equipped with a three-phase motor and linked to a three-phase electrical network, the compensation step includes an operation consisting in rectifying, by a diode bridge, the electrical network and in reversing a phase of the motor.

The method can also be implemented in a device equipped with a three-phase motor and linked to a three-phase electrical network in which the compensation step includes an operation consisting in injecting the charge current via the midpoints of the coils of the stator of the motor.

Another aspect of the invention targets an electric device suitable for implementing the method defined above. Such an electric device may comprise an alternating current motor, an inverter of the energy storage means and of the switching means making it possible either to enable the powering of the motor or to enable the charging of the energy storage means by the inverter, said electric device being characterized in that it comprises means for compensating for the magnetic fields generated during the charging of the energy storage means making it possible to limit or eliminate the movements of the rotor of the motor.

BRIEF DESCRIPTION OF THE DRAWINGS

The present invention will be better understood from reading about a detailed exemplary embodiment, with reference to the appended drawings, supplied by way of nonlimiting example, in which.

DETAILED DESCRIPTION OF THE INVENTION

Figure 6:
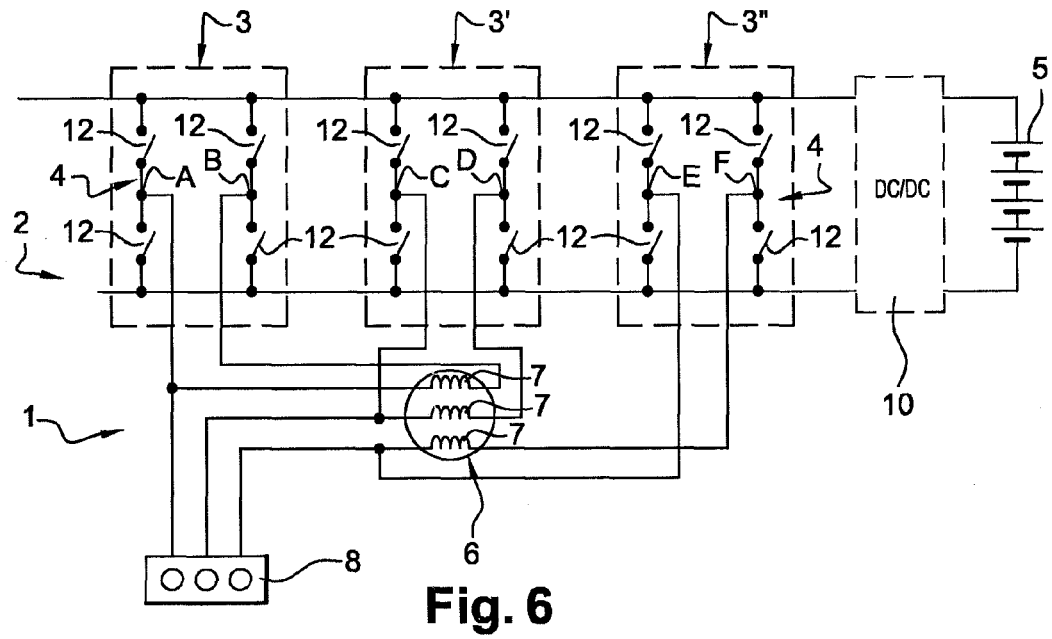
FIG. 6 schematically represents an exemplary embodiment of the connection of the motor, inverter, energy energy storage means assembly and network outlet.

Referring mainly to FIG. 6, a device 1 according to the invention can be seen represented, with an inverter and switching means 4 comprising three H-shaped bridges, 3, 3', 3". Each bridge 3, 3', 3" comprises four switches 12 (consisting, in the present example, of power transistors) distributed on arms referenced A to F. The device 1 also comprises energy energy energy storage means 5, a motor 6, represented partially, the windings 7 of which serve as inductance.

The device 1 also comprises a connector system 8 making it possible to connect to the outlet of the electrical network 11.

The switching from the power supply mode to the charging mode is managed by a control circuit 9 (in FIG. 6, the link between the control circuit 9 and the switches 12 has not been represented to make it easier to read the figure). Referring to FIG. 6, it can be seen that the device 1 also comprises a DC/DC converter 10 arranged between the H-shaped bridges and the energy energy energy storage means 5, the latter makes it possible to adapt the voltages and consequently optimize the dimensioning of the inverter without degrading efficiency.

Figure 1:
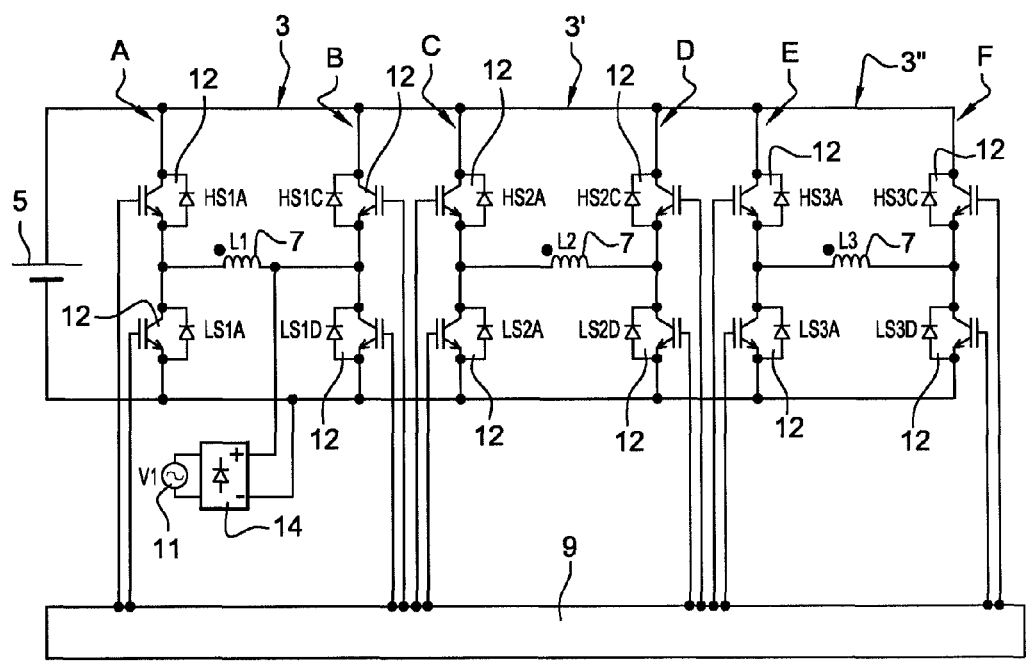
FIG. 1 schematically represents an exemplary embodiment of a three-phase inverter with a single-phase electrical network, the compensation being performed by a diode bridge.

FIG. 1 targets an embodiment combining a three-phase motor and a single-phase charging electrical network, the compensation being performed by rectification of the network. FIG. 1 represents an inverter 2 with a control circuit 9 and a single-phase electrical source or network 11. The single phase of the network 11 is connected to the first phase of the motor 6 to make it possible to charge the energy energy energy storage means 5. More specifically, the phase of the network 11 is connected so as to use the first coil 7 of the stator of the motor 6 as inductance during charging.

During this charging step, a magnetic field is created in the motor that includes a homopolar component which attracts and repels in succession the poles of the rotor of the motor 6. Depending on the rotor types, it is thus possible for the rotor to vibrate or start rotating during the charging of the energy storage means 5 and, in particular, in the case of use of a permanent-magnet rotor. Even in the case of a wound rotor, if the latter is not insulated from its power supply, spurious induced currents can appear in the rotor and set the latter in motion. The use of a diode bridge 14 as compensation means makes it possible to create a unipolar field that varies only in amplitude. These compensation means prevent the appearance of the attraction repulsion phenomena in a permanent-magnet rotor.

Figure 2A:
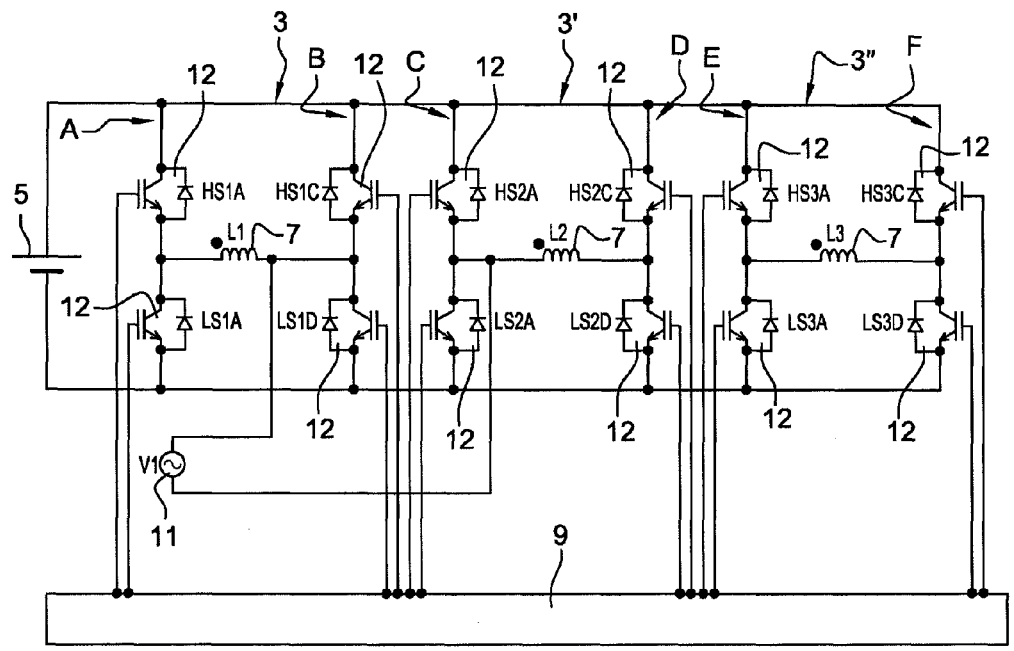
FIGS. 2A and 2B schematically represent two exemplary embodiments of a three-phase inverter with a single-phase electrical network, the compensation being performed by current injection.
Figure 2B:
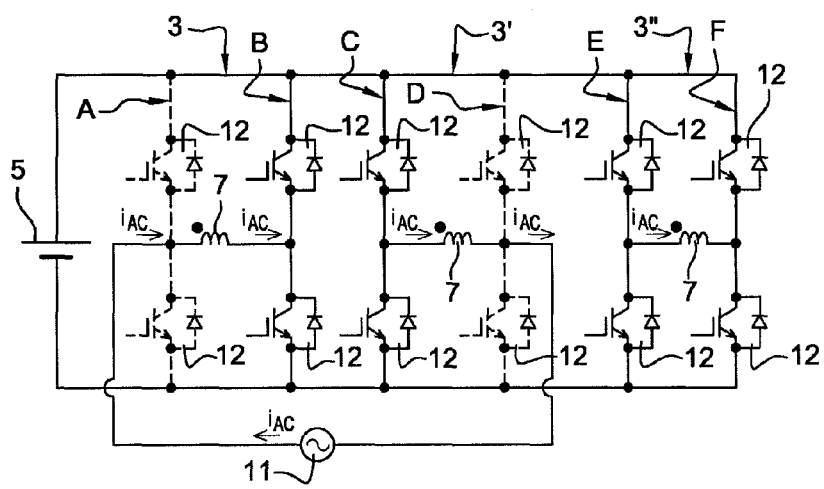

FIGS. 2A and 2B target an embodiment combining a three-phase motor and a single-phase charging electrical network, the compensation being performed by current injection. FIG. 2A represents an inverter 2 with a control circuit 9 and a single-phase electrical network 11. In this example, the compensation consists in injecting into the remaining phase a current identical to that used for charging. The compensation consequently makes it possible to thus inhibit the effect of the charge current with respect to the rotor.

The compensation of the magnetic fields during the charging step is in this case performed by a compensation operation during which the control circuit 9 drives the switches 12 so as to inject, into each of the two phases of the motor that have remained free (that is to say, into the two coils of the stator of the motor 6 that are not linked to the network 11), a compensation current determined by the control circuit 9 so that the vector sum of the magnetic fields created by each of the three coils 7 is zero. This makes it possible to reduce or eliminate the movements of the rotor due, for example, to dissymmetries of the motor.

As an example, compensation currents identical to the charging current can be injected, thus inhibiting the effect of the charging current with respect to the rotor. The control circuit 9 thus determines the compensation current by slaving it to the charge current.

As a variant, or in addition, the compensation currents can also be determined by the control circuit 9 according to the position of the rotor of the motor 6 supplied, for example, by a sensor. The compensation current is then slaved to the physical position of the rotor, that is to say that it is modified until the rotor is immobilized or exhibits an acceptable movement.

FIG. 2B shows a variant in the connection of the single-phase network to the H-shaped bridges (3, 3', 3"). The link from the control circuit 9 to the transistors of the H-shaped bridges has not been represented to keep the figure simple. These links are identical to those of FIGS. 1 and 2A.

In all the figures, the points that can be seen in proximity to the motor windings 7 define the winding direction of the winding in the notches provided for this purpose. The winding is such that if balanced three-phase currents supply the coils 7 of the motor 6 via each of the terminals indicated by the point, the magnetomotive force system is a balanced three-phase system. In a misuse of language, it is said that the terminal of a coil 7 marked by a point is the positive terminal.

In FIG. 2B, the single-phase network is connected so that the neutral of the network is on a coil 7 terminal that is said to be positive and the phase is on a negative terminal. Thus, from the viewpoint of the motor 6, the currents passing through its first two coils are in phase. It is then sufficient to inject into the remaining coil 7 a current that is in phase. Thus, the fields generated on the stator of the motor 6 are in fact on the rotor because the vector sum of the currents of the coils 7 of the motor taking into account their spatial offset is zero.

During charging, one of the possible commands is to drive the arms B and C in phase opposition. For example, the arms B and C can be controlled according to a conventional PWM (Pulse Width Modulation) control in order to produce the PFC (Power Factor Corrector) function. There will be no more detailed discussion here concerning how to control the current to produce all the functionalities of a battery charger, which is known to those skilled in the art. To produce the compensation, the arms E and F are driven in the present example so as to generate a current equal in amplitude and in phase on the corresponding coil 7, the role of which is to compensate for the stator field created by the first two coils 7. The arms A and D are represented in dotted lines because they are not controlled during this charging phase. The compensation is thus produced by the arms E and F.

A variant of the embodiment of FIG. 1 consists in complementing the compensation by rectification of the network with a compensation by current injection into the remaining free phase of the motor, as in the embodiment of FIGS. 2A and 2B.

Figure 3:
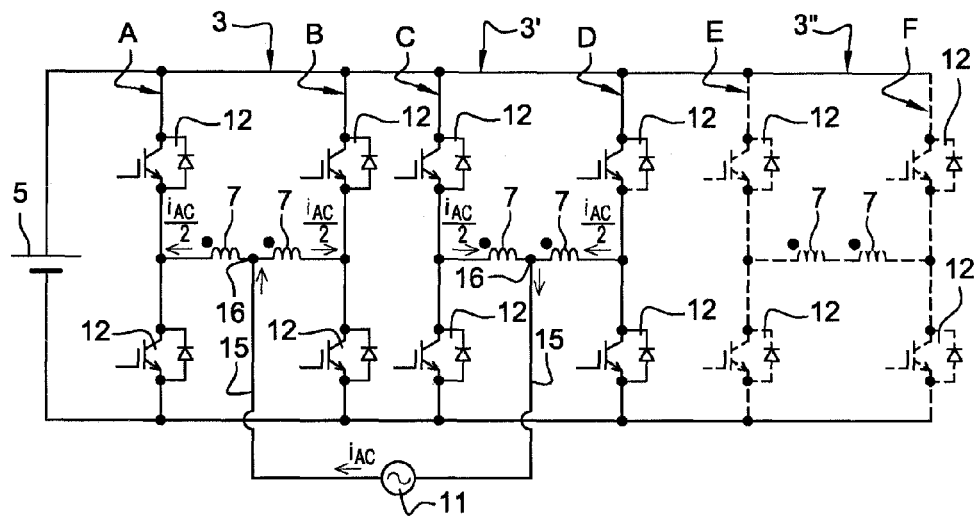
FIG. 3 schematically represents an exemplary embodiment of a three-phase inverter with a single-phase electrical network, the compensation being performed by injection of the charge current via the mid-points of the coils.

FIG. 3 targets an embodiment combining a three-phase motor and a single-phase charging electrical network, the compensation being performed by current injection at the mid-points of the windings 7 of the motor 6. FIG. 3 represents an inverter 2 with a control circuit 9 and a single-phase electrical network 11. In this example, the compensation means are produced by connecting the terminals 15 of the electrical network 11 via the mid-points 16 of two coils of the stator of the motor 6. During the charging step, the current is input at the mid-points 16. This introduction means that the charge currents are balanced between each half-coil and consequently do not create any magnetomotive force.

The arms A and B as well as C and D are driven in the present example so as to generate currents that are equal in amplitude but in phase opposition from the viewpoint of the motor 6. For example, the arms B and C can be controlled according to a conventional PWM control in order to produce the PFC function. Since the currents of each half-coil flow in the same notches but in opposite directions, as indicated in the figure, the magnetomotive force is therefore zero. There is no field created on the stator by virtue of this compensation. Nevertheless, these currents are in phase from the viewpoint of the battery charger.

The battery charging is handled, as in a conventional charger, by the arms A, B, C and D and by the leakage inductances of each pair of half-coils. In practice, the coupling of the two half-coils is not perfect even though they pass through the same notches, this being due to the inevitable shape imperfections of the coils. These imperfections therefore form an inductive element for the charger function. The arms E and F are not controlled during this charging phase.

As a variant, the coils can be arranged so that the currents of each half-coil do not flow in the same notches.

Figure 4:
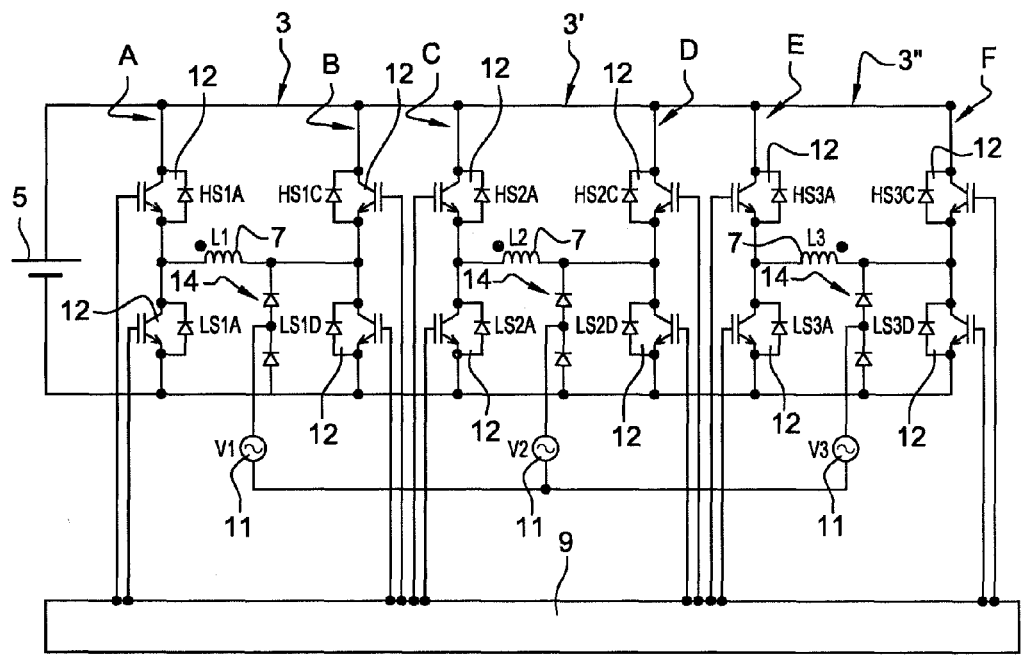
FIG. 4 schematically represents an exemplary embodiment of a three-phase inverter with a three-phase electrical network, the compensation being performed by diode bridges.

FIG. 4 targets an embodiment combining a three-phase motor and a three-phase charging electrical network, the compensation being performed by rectification of the network. FIG. 4 represents an inverter 2 with a control circuit 9 and three-phase electrical network 11. In this exemplary embodiment, the compensation means comprise diode bridges 14. To improve the compensation and prevent any rotation of the rotor, the compensation may include an additional step consisting in reversing a phase of the rotor of the motor 6. This reversal can be produced simply by reversing the connection of one of the inductive windings of the stator (see FIG. 4 in which, for the leftmost winding in the figure, the point is to the right of this winding whereas, for the other two windings 7, the point is to the left of the corresponding winding).

Figure 5:
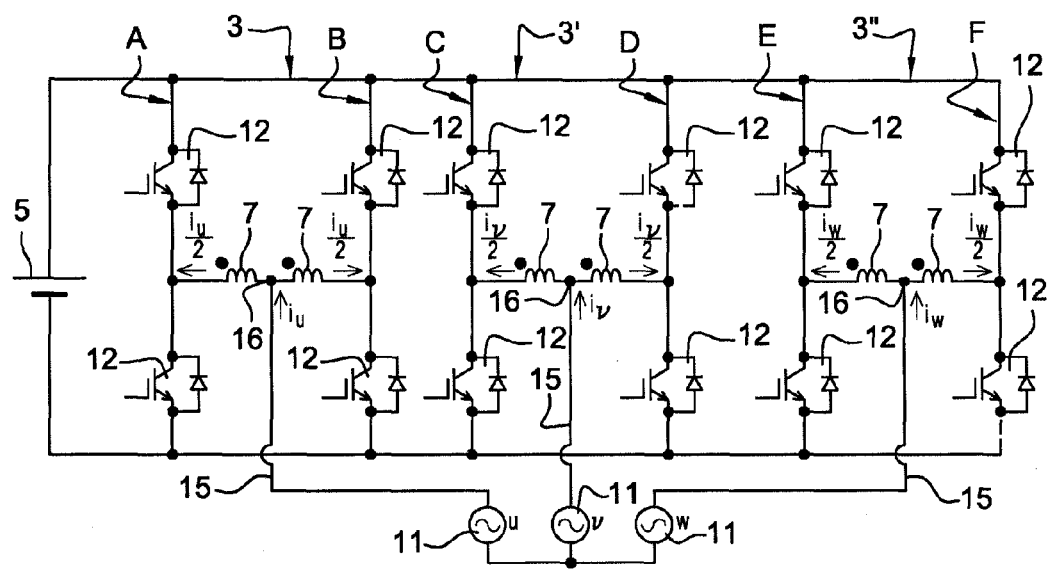
FIG. 5 schematically represents an exemplary embodiment of a three-phase inverter with a three-phase electrical network, the compensation being performed by injection of the charge current via the mid-points of the coils.

FIG. 5 targets an embodiment combining a three-phase motor and a three-phase charging electrical network, the compensation being performed by current injection at the mid-points of the windings 7 of the motor 6. FIG. 5 represents an inverter 2 with a control circuit 9 and a three-phase electrical network 11. In this exemplary embodiment, the compensation means are produced by connecting the electrical network 11 to the mid-points 16 of the coils of the stator of the motor 6. All the arms A to F are in this case controlled according to a conventional PWM control in order to produce the PFC function.

The input of the current, during the energy energy energy storage means charging mode, at the mid-points means, in the same way as was described in the example of FIG. 3 for a single-phase electrical network, that the charge currents are balanced between each half-coil and consequently do not create any magnetomotive force.

This solution for compensation by current injection into the mid-points of the coils has the advantage of advantageously reducing the apparent inductance of the charger (this is also valid for the embodiment of FIG. 3). In practice, in order to produce a device producing the PFC function, the inductance of the coils must not be too great so as not to distort the wave of the current. When the power factor is unitary, the current is in phase with the voltage. The slope of the current is maximum when the voltage is zero. If the inductance is high, the rise of the current will take longer and will reach its maximum slope with a delay. The consequence is a distortion of the current during the transition to zero. This distortion is a source of harmonics. As it happens, the leakage inductance is much less than the magnetizing inductance. Generally, the ratio of the leakage inductance to the magnetizing inductance is from 1 to 10%. In the case of a high-voltage machine, the value of the inductance increases with the square of the control voltage. For high-voltage systems, the inductances of the stator coils of the electric machines are too high to produce a charger with control of the power factor. The solution of FIGS. 3 and 5 makes it possible to divide this inductance by 10 or even 100. For example, a 50 KW machine engineered for an inverter with a 900 V H-shaped bridge may exhibit an inductance of 4 mH. This value is not suitable for a 3 KW charger at 230 V. The use of the leakage inductance makes it possible to reduce this value between 400 and 40 pH. The drawback may be a ripple on the current that is greater than the chopping frequency. This ripple can be reduced by increasing the chopping frequency. Bearing in mind that the 3 to 6 KW charger does not use the full capacity of the electronics engineered for a 50 KW inverter, there is no drawback in increasing the switching losses in battery charging mode.

Consequently, in the case of a current injection at the mid-points of one or more coils of the stator (FIGS. 3 and 5), and when the same current is injected into the two half-coils (formed by the existence of the mid-point), the inductances of the two half-coils are canceled out. Only the leakage inductance associated with the imperfections of the coils remains apparent, this inductance being much lower and better suited to use in a charger.

Other features of the invention could also have been envisaged without thereby departing from the scope of the invention defined by the claims below. Thus, in the various examples taken up in the description the compensation means are detailed with a three-phase motor, but the teachings of this description can be transposed and extended generally to polyphase electric machines.

As in the examples cited the inverter has an H-shaped bridge structure, the invention however is not limited to this structure and notably can be extended to a conventional structure with an inverter produced with three-phase bridges and switching means of power contactor type to switch from a battery charging mode to a motor power supply mode. Moreover, the various embodiments described here can be combined, just as the compensation step can be performed by a combination of the various compensation means described.

In the examples cited, the expression "mid-point", when it relates to a coil, may designate not only the point of connection of two half-coils with the same number of turns, but also the point of connection of two half-coils with different numbers of turns. The expression "mid-point" is therefore used here in accordance with its usual meaning in electronics, equally covering a point taken at the exact middle of a coil, and a point dividing the coil into two unequal portions (for example, one portion comprising two thirds of the total number of turns and another portion comprising one third of the total number of turns). In the same spirit, the terms "half" or "half-coil" designate one of these portions, even if the latter comprises a number of turns that is different from half the total number of turns of the coil. The charge currents are then distributed in each half-coil in such a way as to reflect the ratio between the number of turns of the half-coil concerned and the total number of turns of the coil.

The invention claimed is:

1. A combined power supply and charging method, comprising:
   controlling switching from a motor power supply mode to an energy storage means charging mode on an electrical network and vice versa;
   compensating for magnetic fields during the energy storage means charging mode in order to limit or eliminate movements of a rotor of the motor, wherein compensating for the magnetic fields comprises injecting a compensation current into one or more phases of the motor that are not linked to a phase of an electrical network,
   wherein the combined power supply and charging method is for implementing a device equipped with the motor and linked to the electrical network, a number of phases of which is less than a number of phases of the motor.

2. The method as claimed in claim 1, wherein the compensation current is slaved to the position of the rotor of the motor.

3. The method as claimed in claim 1, wherein the compensation current is slaved to a charge current that is injected into one or more phases of the motor that are linked to a phase of the electrical network.

4. The method as claimed in claim 3, wherein compensating for the magnetic fields comprises injecting the charge current via a mid-point of at least one inductive winding of a stator of the motor.

5. The method as claimed in claim 4, in which, during said charge current injection operation, the same charge current is injected into each half of said inductive winding.

6. The method as claimed in claim 1, wherein compensating for the magnetic fields comprises rectifying the electrical network by a diode bridge.

7. The method as claimed in claim 1, for implementing the device equipped with a three-phase motor and linked to a single-phase electrical network, wherein compensating for the magnetic fields comprises:
   rectifying the single-phase electrical network by a diode bridge, and
   injecting, into one or more phases of the motor that are not linked to a phase of the single-phase electrical network, a current equal to a charge current injected into one or more phases of the motor that are linked to a phase of the single-phase electrical network.

8. The method as claimed in claim 1, for implementing the device equipped with a three-phase motor and linked to a single-phase electrical network, wherein compensating for the magnetic fields comprises:
   rectifying, by a diode bridge, the single-phase electrical network, and
   injecting a charge current via a mid-point of at least one coil of a stator of the motor.

9. The method as claimed in claim 1, for implementing the device equipped with a three-phase motor, and linked to a single-phase electrical network, wherein compensating for the magnetic fields comprises injecting a charge current via a mid-point of at least one coil of a stator of the motor.

10. The method as claimed in claim 1, for implementing the device equipped with a three-phase motor and linked to a three-phase electrical network, wherein compensating for the magnetic fields comprises: rectifying, by a diode bridge, the three-phase electrical network, and reversing a phase of the motor.

11. The method as claimed in claim 1, for implementing the device equipped with a three-phase motor and linked to a three-phase electrical network, wherein compensating for the magnetic fields comprises injecting a charge current via mid-points of the coils of a stator of the motor.

12. A combined power supply and charging method, comprising:
   controlling switching from a motor power supply mode to an energy storage means charging mode on an electrical network and vice versa;
   compensating for magnetic fields during the energy storage means charging mode in order to limit or eliminate movements of a rotor of the motor,
   wherein the combined power supply and charging method is for implementing a device equipped with a three-phase motor and linked to a single-phase electrical network,
   wherein compensating for the magnetic fields comprises injecting, into one or more phases of the motor that are not linked to a phase of the single-phase electrical network, a current equal to a charge current injected into one or more phases of the motor that are linked to a phase of the single-phase electrical network.

13. A combined power supply and charging electric device, comprising:
   an alternating current motor;
   an inverter;
   energy storage means;
   switching means for enabling one of powering of the motor or charging of the energy storage means by the inverter; and means for compensating for magnetic fields generated during the charging of the energy storage means in order to limit or eliminate the movements of a rotor of the motor, wherein means for compensating for the magnetic fields comprises injecting a compensation current into one or more phases of the motor that are not linked to a phase of an electrical network, and the device being equipped with the motor and linked to the electrical network, and having a number of phases less than a number of phases of the motor.

* * * * *